Sept. 10, 1963 H. SENIOR 3,103,243
APPARATUS FOR MAKING DISHED RECEPTACLES
Filed June 3, 1959 11 Sheets-Sheet 1

INVENTOR
HENRY SENIOR
BY
Larson and Taylor ATTORNEY

Sept. 10, 1963 H. SENIOR 3,103,243
APPARATUS FOR MAKING DISHED RECEPTACLES
Filed June 3, 1959 11 Sheets-Sheet 3

INVENTOR
HENRY SENIOR
BY
Larson and Taylor ATTORNEY

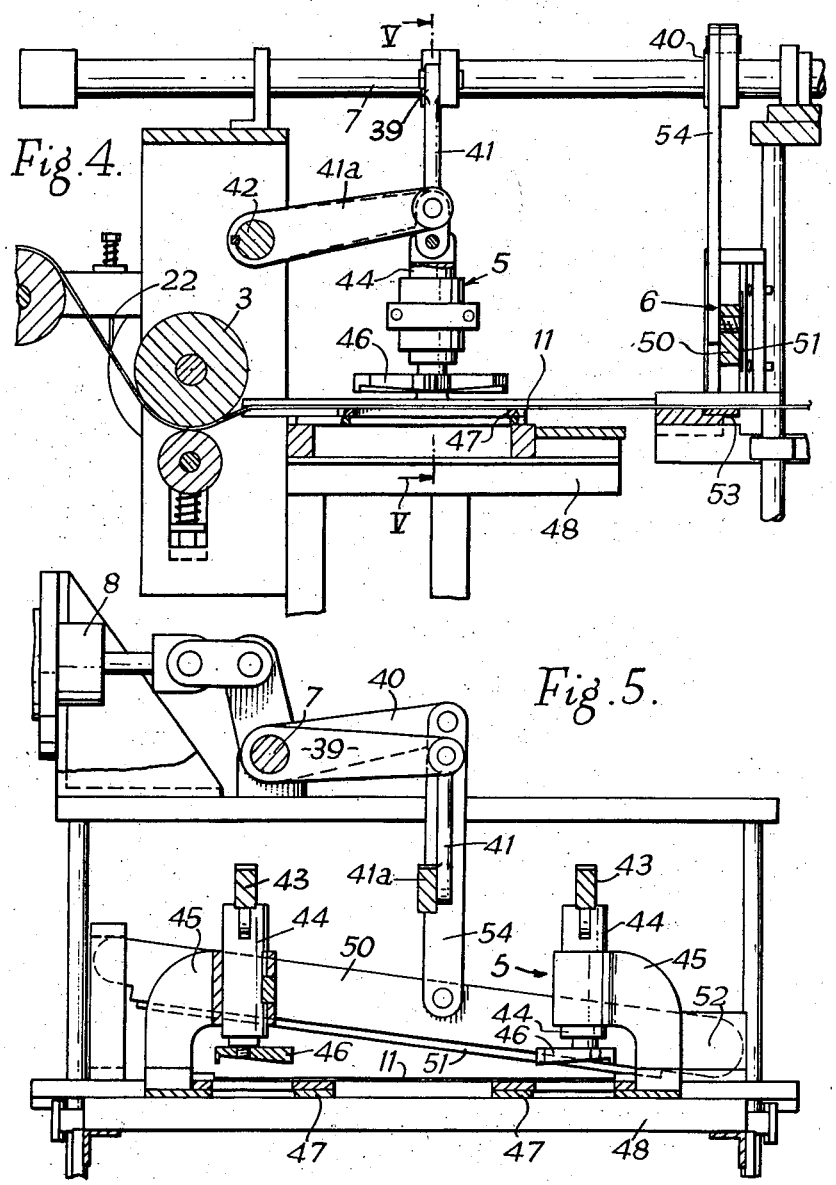

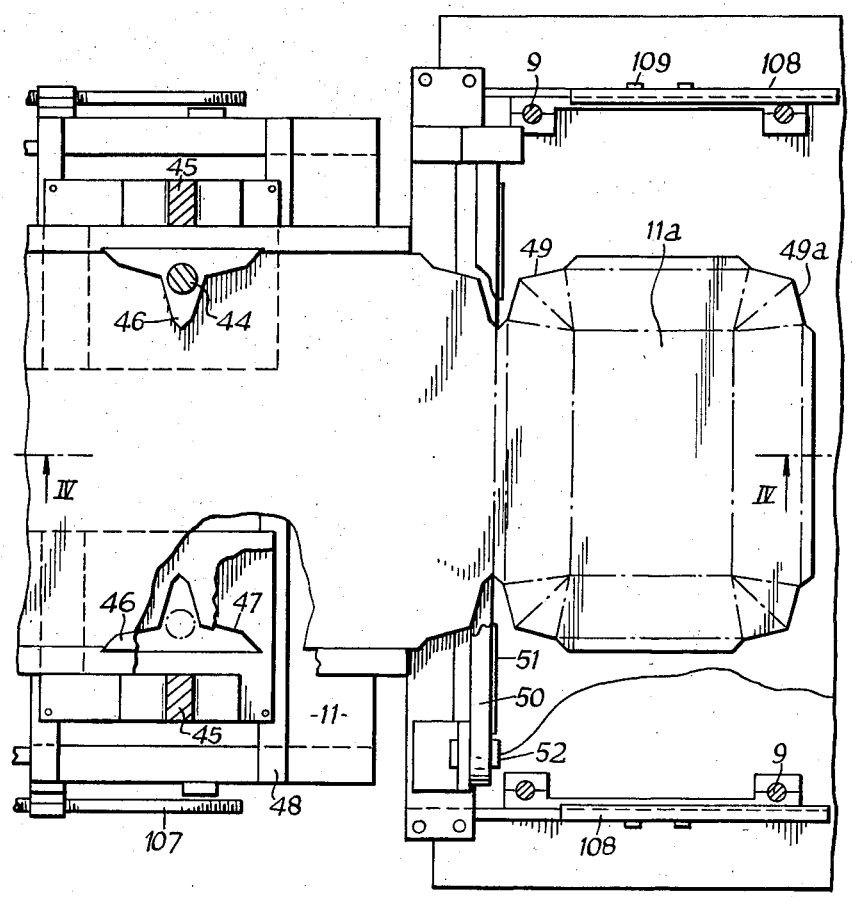

Sept. 10, 1963 H. SENIOR 3,103,243
APPARATUS FOR MAKING DISHED RECEPTACLES
Filed June 3, 1959 11 Sheets-Sheet 6

INVENTOR
HENRY SENIOR
BY
*Larson and Taylor*
ATTORNEY

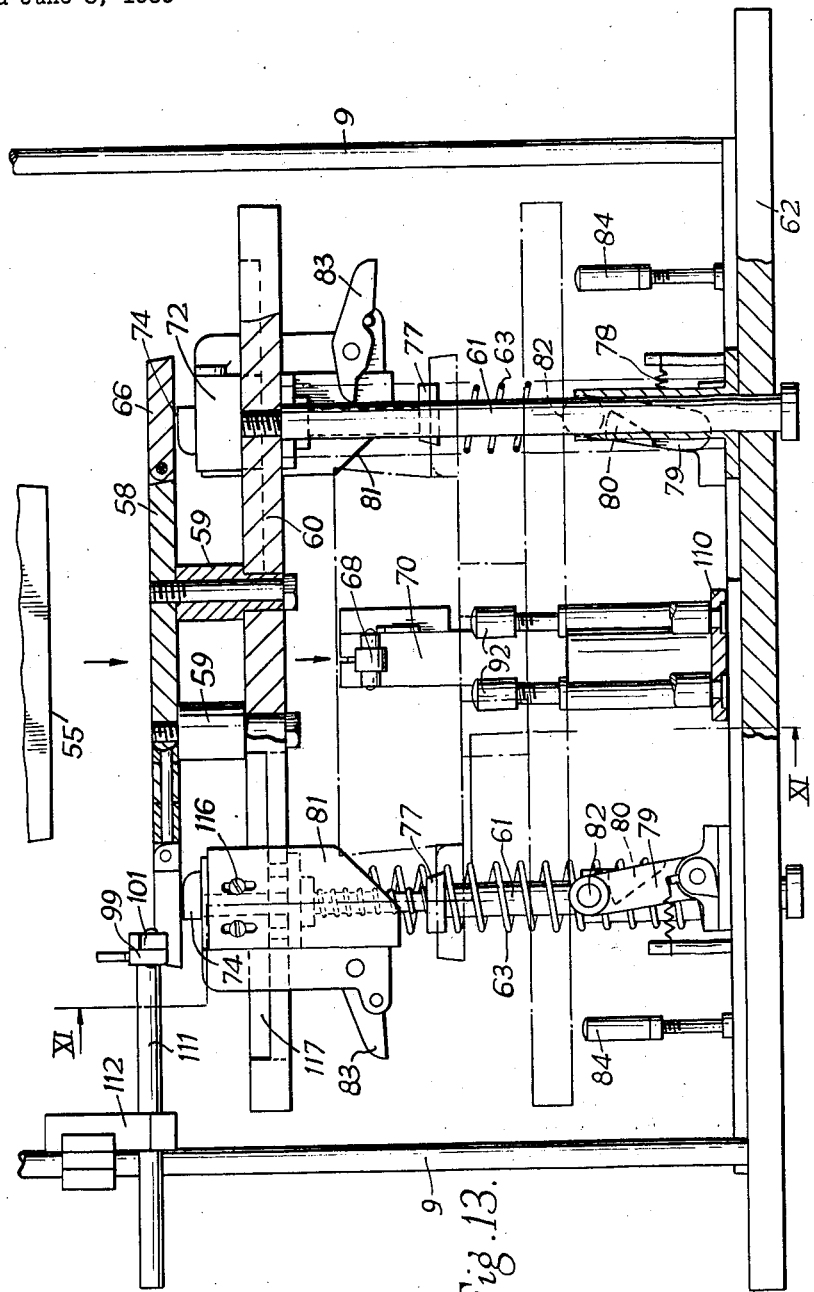

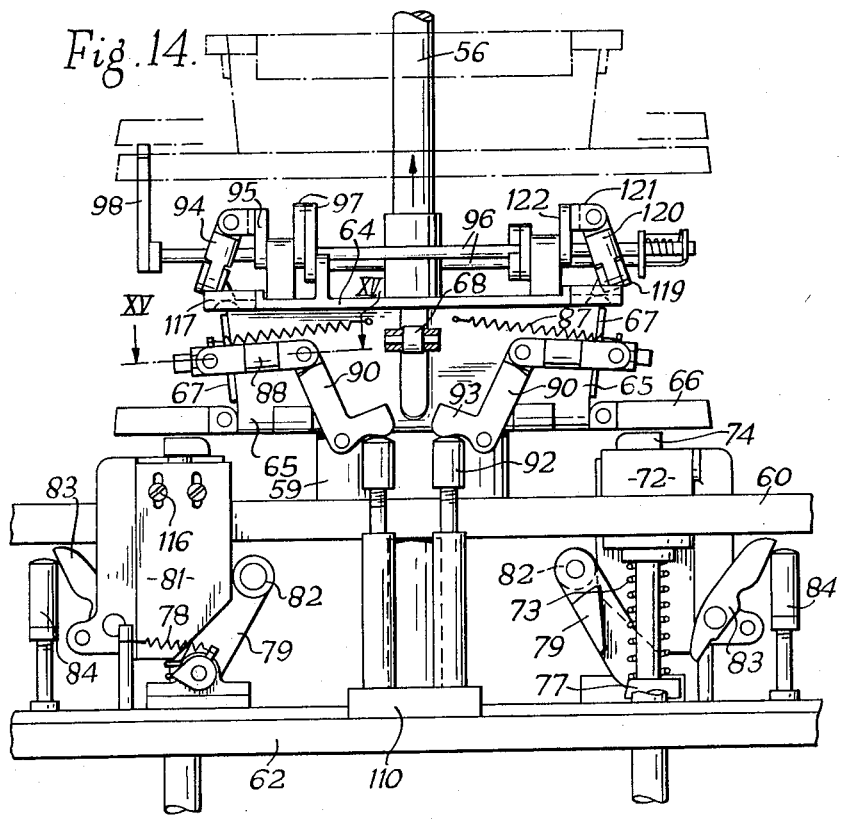
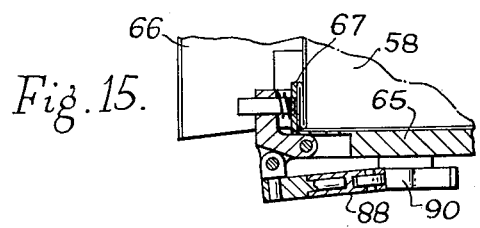

Sept. 10, 1963  H. SENIOR  3,103,243
APPARATUS FOR MAKING DISHED RECEPTACLES
Filed June 3, 1959  11 Sheets-Sheet 11
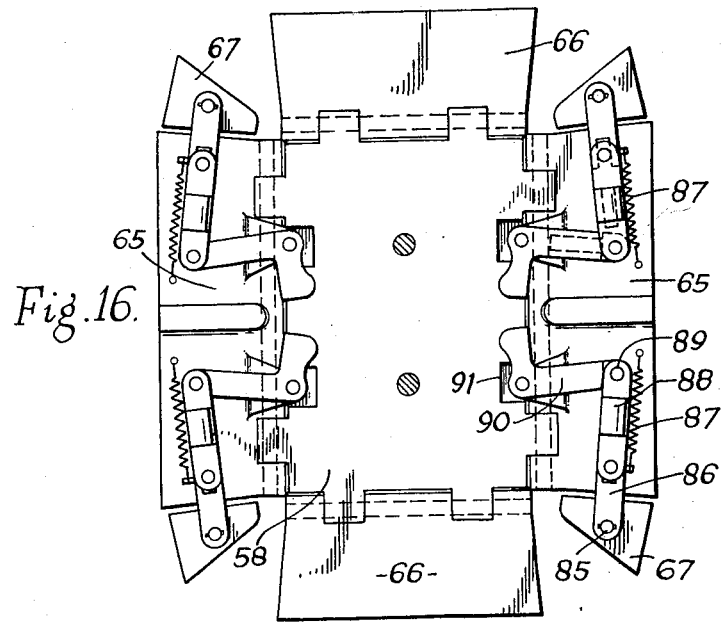
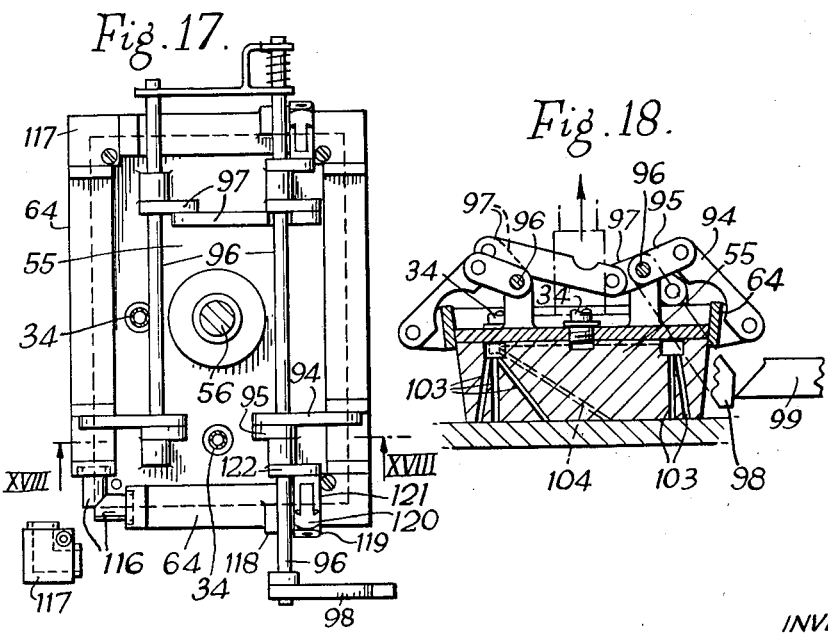
INVENTOR
HENRY SENIOR
BY
ATTORNEY United States Patent Office 3,103,243
Patented Sept. 10, 1963

3,103,243
APPARATUS FOR MAKING DISHED
RECEPTACLES
Henry Senior, Leicester, England, assignor to The British Xylonite Company Limited, London, England, a British company
Filed June 3, 1959, Ser. No. 818,998
Claims priority, application Great Britain June 4, 1958
10 Claims. (Cl. 153—2)

The present invention is concerned with apparatus for making dished receptacles, hereinafter for convenience referred to as "pans."

Briefly stated, the method of this invention comprises the formation of a pan from a blank of sheet material by folding the blank so as to form pan side walls disposed around, and at an angle to, a bottom-forming section of the blank, producing from the ends of adjacent side walls at each corner an outwardly-projecting double thickness flap, folding these flaps down on adjacent side walls, and turning over the margin of the pan to retain the walls and flaps in their respectively-folded conditions and to provide the pan with a smooth rim, these operations being performed in one reciprocating stroke of the blank during which said bottom-forming section is clamped.

The sheet material employed may be of various kinds, provided it is capable of being folded without undue difficulty and is capable of retaining its folded shape, i.e. is not self-restoring or resilient to any appreciable degree. A metal foil or sheet metal of thin gauge is a very suitable material of this character. A formed pan made of these materials is self-maintaining without additional fastening means, this sustaining of the pan being secured by the rim which is turned over and to hold the folded corner wings, and being a sufficient fastening when the pan is in use as a receptacle.

Preferably the individual pans, formed as indicated above will be blanked out from a continuous web of parent stock, and in accordance with a further feature of the invention these individual blanks are cut from an intermittently-forwarded web at a stage in the procedure when the leading section of this web (representing the next blank) is actually clamped at the start of the folding and shaping reciprocation. This allows for an optimum use of the web of sheet material and a minimum of fabricating steps, the leading edge of one blank being directly separated from the trailing edge of the preceding blank, and for positive control and correlation of the progress of the feeding and shaping of the sheet material. The shaping of the pan from the blank being formed in one reciprocation, the only interruption of the forward feed is the single dwell to allow for this reciprocation, and this enables a high rate of output to be achieved and avoiding waste.

For convenience of description, it will hereinafter be assumed that the shaping operation is performed by bending up the side walls of the embryo pan from the bottom-forming section. It will be appreciated, of course, that the invention is not limited to this particular arrangement and that the walls could instead be turned down, or the relative movement could be otherwise.

Further, if the blank is rectangular for the purpose of making a rectangular pan (as is most convenient) the double thickness corner wings obtained when the parent side walls are brought symmetrically face to face will be triangular and of the same depth as the adjacent walls of the pan. To allow for the turning over of the marginal rims without producing bulky, unsightly and awkward corners, these corners are advantageously shortened relatively to the remainder of the upturned parent side walls before the rim folding occurs.

Advantageously, moreover, the removal from the corners of the blank of the small amount of excess material required for this purpose is, in accordance with a further feature of the invention, performed during the severance of the individual pan blanks from the parent web, thus avoiding the need to perform this corner shortening operation as a separate step. Again, it has been found advantageous to perform this corner shortening during each detachment of a blank from the leading end of the web, by a punching operation in which the trailing corners of the next-following blank, and the leading corners of the next-but-one, are simultaneously shortened.

The invention also includes a machine for carrying out the method recited in the foregoing, this machine comprising cooperating shaping members which are relatively movable and adapted to be brought together for the purpose of clamping between them a pan blank with a marginal part extending around and projecting laterally from the bite between them, a first set of tools for folding the marginal part to produce all the side walls of the pan (i.e. the side and end walls) a second set of tools for folding over the corner flaps thereby produced, and a third set of tools for folding over the rim of the pan, these various folding tool sets being operable in the appropriate sequence in response to a reciprocation of the shaping members in the machine.

Preferably the folding tools are movable with the shaping members, during said reciprocation, relatively to fixed abutments on the machine, whereby these abutments cause the folding tools to work in a pre-arranged folding sequence on the marginal parts of the blank clamped between the shaping members and travelling therewith.

Advantageously, moreover, the shaping members referred to comprise a platen to receive the blank, and a die which is movable to clamp the blank against the platen and subsequently to move the latter, and the folding tools, relatively to the abutments.

Moreover, the first and second sets of folding tools are conveniently carried by the platen and the third set by the die, and these are operable by the aforesaid fixed abutments to perform their respective actions in the appropriate sequence during the travel in common of the die and platen with the pan blank clamped between them.

The arrangement preferably is further that, in the case of a rectangular pan (which will hereinafter be assumed for convenience), the first set of folding tools is in two groups each serving one of the two pairs of opposite sides of the pan, and the second set of tools for folding the corners is carried by the tools of one group of the first set. In this arrangement the abutments are arranged so that, after all four pan sides have been swung up against the die, one group of the first tool set (i.e. a group of two opposite side-folding tools) is allowed to fall away from engagement with the blank and leave the associated pan walls upstanding and exposed, whilst the tools of the other group (carrying the second and corner-folding tool set) continue in contact with their walls whilst this second set are moved round to press the corner flaps against the two exposed sides.

This arrangement is conveniently further devised so that, during the return stroke of the assembly, the second group of the first set and the second set of tools move out of the way and the third set is operable, again by fixed abutment means, to fold the pan rim down in response to the travel of the assembly.

As has already been indicated, it is preferred that the individual blanks shall be cut from an intermittently-forwarded web and a machine devised for this purpose includes means for severing the web which are timed to operate simultaneously with the clamping of the blank, until that instant forming the leading end section of the parent web, between the die and the platen. As indicated above, this enables the blank to be cut cleanly without any danger of shifting and, in fact, in a position from which it can be immediately moved through its shaping reciprocation, the latter for example taking place in the vertical direction (as remarked above) relatively to a horizontal feed direction.

Thus the machine is advantageously equipped so as to be able to perform an automatic working cycle for forming each pan, consisting of a first phase in which the web is fed forwards, e.g. from a reel, and a second phase in which this feed interrupted for a brief period whilst its leading end is severed, is carried down to be shaped as a result of a reciprocation of the die and platen assembly, and is ejected, followed by the commencement of a fresh cycle. Means are, of course, provided to correlate and time these various movements in relation to one another.

The blank cutting assembly may comprise a guillotine for severing and detaching the blank from a web, and punches for cutting out portions of the lateral edges of the web to form the shortened corner flaps referred to, said punches and guillotine being operable simultaneously.

A further feature of this machine lies in means automatically operable, at a stage in the movement of a die after the completion of the formation of a pan, to send an air blow through the die to eject this pan.

Various means may be used, in a machine having the various features referred to, for operating the various parts and correlating the movements in the cycle, but in one preferred arrangement we use a hydraulic drive to the various parts, as will be described below in reference to a specific example. In this the feeding means and the shaping assembly are operated by hydraulic systems connected in series and each triggered in turn by the other.

The machine described is advantageously devised to allow for adjustment of the parts to compensate for variations in dimensions of the finished pan, accompanied by a simple substitution of parts of the shaping members (i.e. die and platen) corresponding to the new pan size. All the remaining parts of the mechanism, viz. the feeding and cutting assemblies and the means for operating the folding tools are adaptable to the changed pan size by a simple adjustment. Again, reference is made below to one way in which this arrangement is carried into practice in a specific machine.

A machine incorporating the principles of the present invention is illustrated by way of example in the accompanying drawings, in which:

FIGURE 4 is a front elevational view, partly in section on the line IV—IV of FIGURE 6, of the cutting assembly of the machine.

FIGURE 5 is a section on the line V—V of FIGURE 4.

FIGURE 6 is a plan view of this part of the cutting assembly.

FIGURE 13 is an enlarged side elevation, corresponding to that of FIGURE 11, but taken at right angles to the latter and in section on line XIII—XIII of FIGURE 12.

FIGURE 14 is another elevation of the shaping assembly, showing the assembly at a later stage in the formation of the pan.

FIGURE 15 is a scrap section on the line XV—XV of FIGURE 14.

FIGURE 16 is a plan view from below of the platen of the shaping assembly.

FIGURE 17 is a top plan view of the die of this assembly, and

FIGURE 18 is a cross section on the line XVIII—XVIII of FIGURE 17.

The machine illustrated is hydraulically operated and is devised to form a rectangular pan from a web of sheet material in a cycle mainly involving a web feed phase followed by a cutting and shaping phase, as outlined above.

Figure 1:
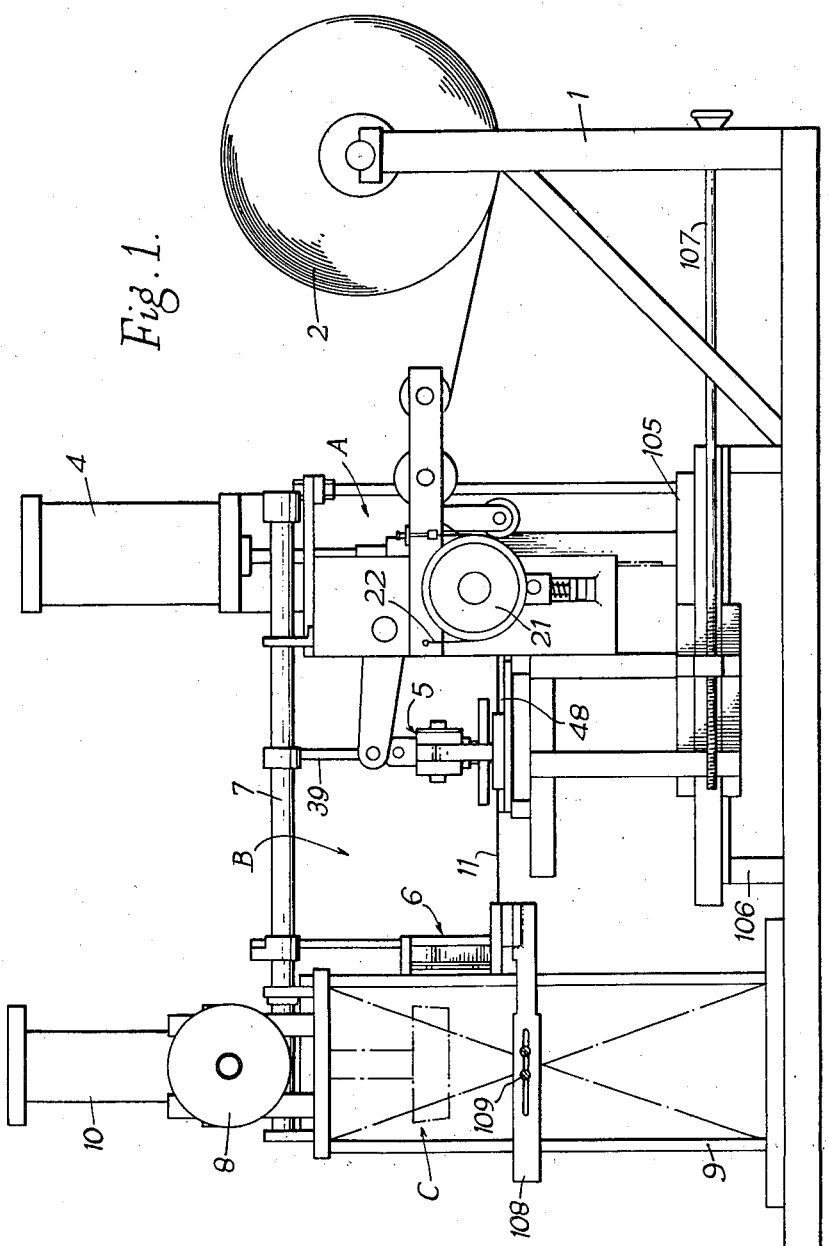
FIGURE 1 is a diagrammatic front elevation of this machine.

From FIGURE 1 it will be seen that the machine comprises a main frame 1 on which a feed assembly generally denoted A, a cutting assembly generally indicated at B, and a shaping assembly denoted C, are supported. Mounted at the feed end of the main frame is a supply reel 2 of the web of pan material, e.g. aluminum foil, and the sheet runs from this over guide rollers into the feed assembly A comprising a feed roller 3 (FIGURE 3) and hydraulic means 4 for operating the same.

The feed assembly forwards the web to the cutting assembly B which comprises first a corner punch mechanism 5 and secondly a guillotine 6 for detaching each blank in turn from the leading end of the web. The punch mechanism and guillotine are operable simultaneously and in common, through a longitudinal shaft 7 in the machine, by means of a piston/cylinder assembly 8.

The shaping assembly C and the piston/cylinder 8 are mounted on a fixed frame 9 and the shaping assembly is operable by a hydraulic means 10 surmounting this frame.

Figure 2:
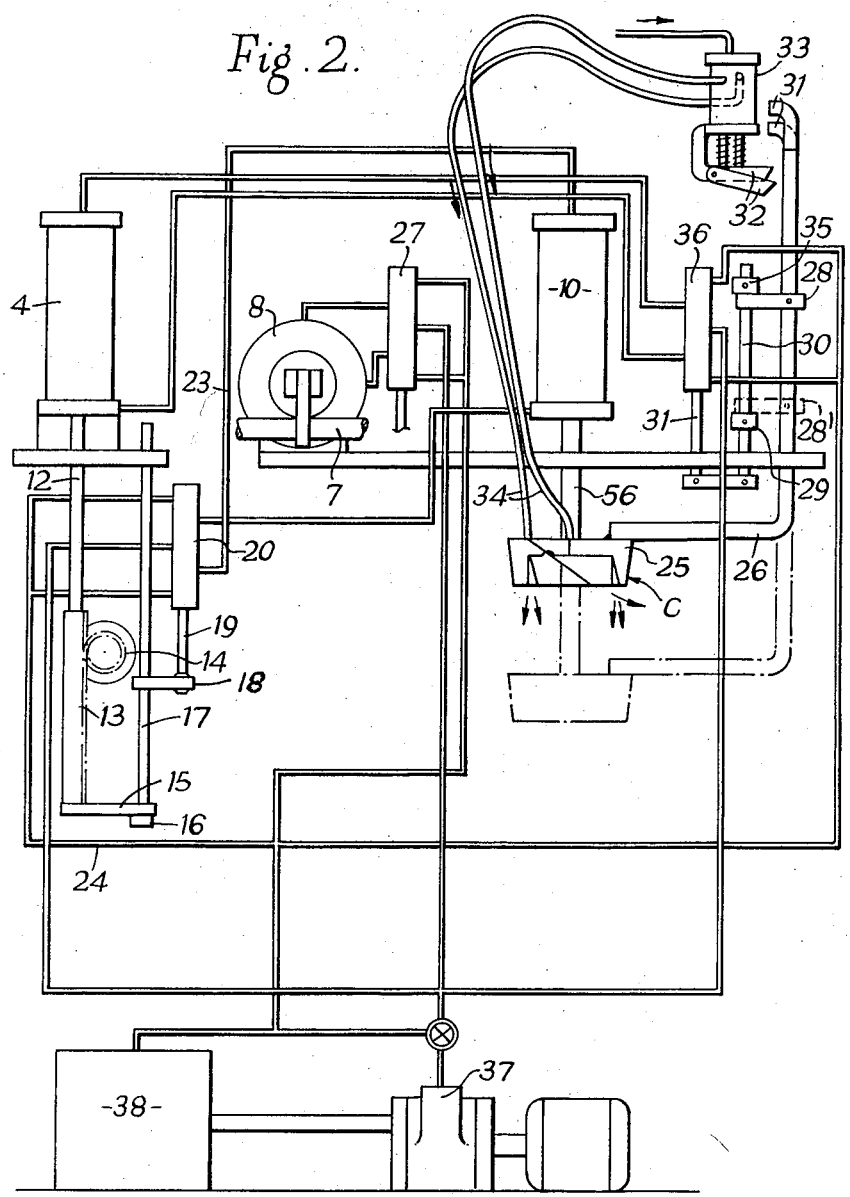
FIGURE 2 is a diagram illustrating the hydraulic layout employed.

FIGURE 2 will serve to elucidate the sequence of operation of these various parts, as follows:

The foil web 11 is forwarded intermittently from the reel 2 by the length in the feed direction (in this case the width) of one blank, whereupon the feed is arrested and the severance of the blank, and its shaping, and ejection of the fabricated pan are performed in one phase during the pause in the feed, followed automatically by the forwarding of the next blank in the next cycle, and so on.

The diagram of FIGURE 2 purports to show the parts at a stage in a cycle when the forward feed of the web through one blank length has just been effected. This forward feed is produced by a downward stroke of the piston rod 12 of cylinder 4, this rod carrying a rack 13 which meshes with a pinion 14 on a shaft of feed roller 3 (see also FIGURE 3). At the end of its downward stroke, i.e. at the termination of the forward feed, a contact bar 15 carried by rack 13 abuts a lower dog 16 on a rod 17 guided for vertical movement in the machine. The rod 17 also has an upper dog 18 which is connected to the plunger 19 of a reversing valve 20 controlling the oil connections, from a pump 37 and reservoir 38, to the piston/cylinders 4 and 10 operating the feed and shaping assemblies.

When bar 15 abuts the dog 16 to operate valve 20, it also hits a fixed stop on the machine frame to arrest the feed roller, and to make this arrest immediate, the shaft of the latter carries a brake drum 21 around which is wrapped a brake strap 22.

The shifting over of the reversing valve 20 sends oil through a pipe 23 to the upper end of cylinder 10, thereby to start the downward movement of the shaping assembly C. As, during its downward movement, the head 25 of the shaping assembly C nears the foil web, a catch (not shown) on an arm 26 attached to this head, trips a cam mechanism (also not shown) to shift over a third reversing valve 27 to control the piston/cylinder 8 of the cutting assembly, whereby the guillotine and corner punch mechanism are operated.

The arm 26 has a contact bar 28 attached thereto and, at the bottom of the down part of the shaping stroke by the assembly C, this bar 28 (then in position 28′) hits the lower dog 29 of a pair on a further slidably-guided rod 30 rigidly connected to the plunger 31 of a second reversing valve 36 receiving oil through line 24. The consequent operation of this valve now sends oil to the lower end of cylinder 4, with the result that the feed rack 13 moves upwardly. By virtue of a free wheel device carried by the pinion 14, this has no effect on the feed roller, but readies the rack for its next feed stroke. At the end of its upward stroke, the contact bar 15 abuts the bar 18 and changes over valve 20, and hence the application of oil to cylinder 10, so as to send the head 25 upwards and back to its starting position.

Simultaneously with the end of the downward movement of head 25, a mechanical dog trip (not shown) is arranged to change over reversing valve 27, so as to re-set the cutting assembly ready for the next stroke. It is also to be noted that the arm 26 is provided at its upper end with two fingers 31 which are spaced laterally and vertically, and these cooperate with two correspondingly-positioned levers 32 controlling an air valve 33 through which air is fed, through flexible pipes 34, to the head 25 for ejection of the finished pan (see below).

Eventually the contact bar 28 hits an upper dog 35 on the rod 30 so as to reverse valve 36, whereby oil is applied to the upper end of cylinder 4 and the cycle re-started. From the foregoing description, therefore, it will be seen that the hydraulic circuit comprises essentially two piston/cylinder assemblies 4 and 10 which are arranged for operation in series, that is the movement of the piston of one causes operation of a reversing valve or relay to start the other. As a result, once the machine is started it continues to function automatically, cycle after cycle, but if any movements should fail, the whole machine is brought to a standstill and the other moving parts safeguarded.

Figure 3:
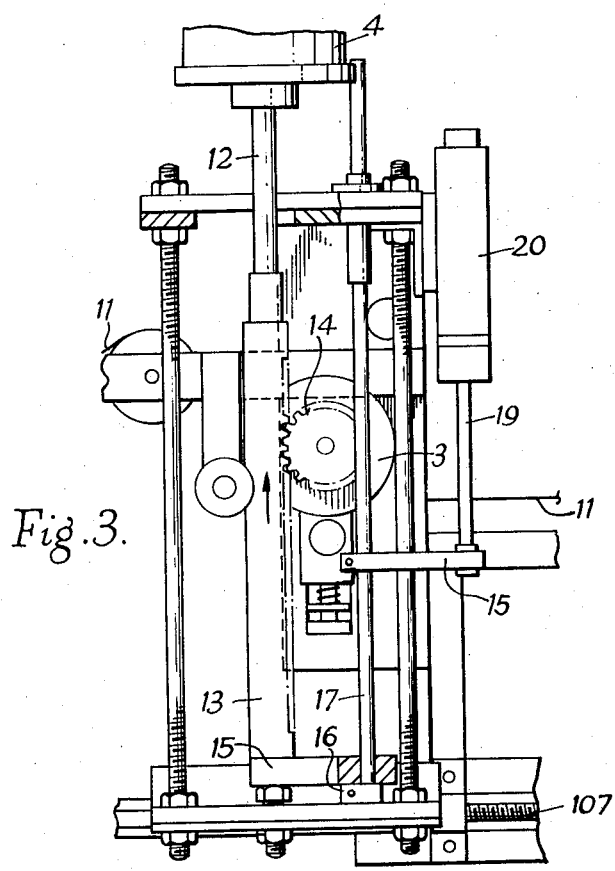
FIGURE 3 is an elevational view of part of the feed assembly.

The cutting assembly, which next follows the feed assembly already described is best illustrated in FIGURES 3 to 5 which show the shaft 7 and the connections through which it operates the corner punches 5 and the guillotine 6, viz. lever arms 39 and 40 respectively.

The arm 39 is coupled through links 41 and 41a to a shaft 42 carrying spaced levers 43 each articulated to a punch stem 44. Each stem is vertically slidable in a bracket 45 and has at its lower end a punch knife 46 co-operating with a conformingly shaped anvil 47 on a table 48. FIGURE 6 illustrates the somewhat T-shaped cut out 49 made at each edge of the foil web 11 by the punches.

The guillotine 6 comprises an arm 50 which is pivoted about a fixed pivot 52 and is articulated to lever 40 through a link 54. The arm 50 carries a knife blade 51 which cooperates with an anvil 53 to sever the web transversely across its width, as at 11a in FIGURE 6. The machine is set up so that this cut bisects the cut-outs 49, leaving each corner of each blank before it is bent from its flat status, with the shape indicated 49a in FIGURE 6.

The shaping assembly C is clearly seen in FIGURES 11 to 14. It primarily comprises a die 55 in the form of a block of the shape and size of the pan eventually to be formed and secured to the piston rod 56 of the assembly 10, and, cooperating with this die 55, a platen 57 in the form of a flat rectangular plate 58 of the size and shape of the intended base of the pan. The parts 55 and 57 constitute the head 25 in the diagram of FIGURE 2.

The plate 58 is carried by means of bolts and spacer blocks 59 on a mounting plate 60 having stout depending guide rods 61 passing through apertures in a platform 62 in the frame 9. The plate 60, and with it the platen 58, are normally urged upwards into a raised position, in which the surface of the platen is level with the incoming foil 11, by means of compression springs 63 arranged around the guide rods 61.

The die block 55 carries the third set of folding tools, viz. a rim folding bar 64 arranged along each edge thereof. The mechanism for operating this third set of tools is described in more detail below.

The first and second sets of folding tools are carried by the platen 58. The first set is made up of a first group consisting of two side folding bars 65 hinged to the two opposite longitudinal edges of the platen, and two end folding bars 66 hinged to the other two edges of the platen. The second set of tools is constituted by triangular corner folding wings 67 hinged to the ends of each of the two side folding bars 65. It will be noted that the wings 67 are of somewhat lesser depth than the parent side bars 65.

Referring now to FIGURES 7 to 10 to illustrate the stages in a pan-forming operation by the means of these tool sets.

Figure 7:
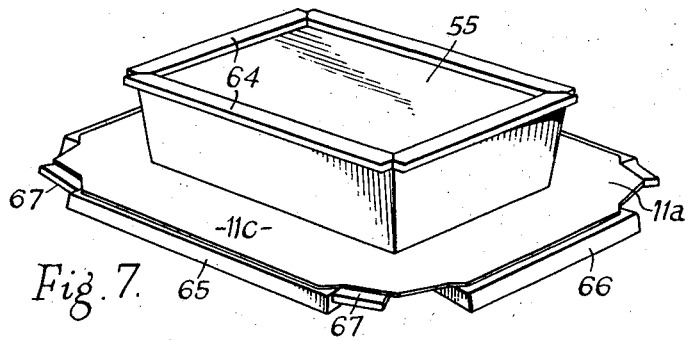
FIGURES 7, 8, 9 and 10 are perspective illustrations of the shaping assembly showing stages in the formation of a blank into its final condition.

On downward movement of the rod 56, the die 55 is first applied, as illustrated in FIGURE 7, against the leading section 11a of the web 11, this having been previously cut to shape at the corners as described above. The setting of the hydraulic controls (described above in connection with FIGURE 2) is such that at the moment of such contact, or immediately before it, the blank 11a is severed from the parent web by the guillotine 50; this clamping of the blank 11a between the die 55 and the platen 58 at the critical time ensures the production of a clean cut.

Figure 8:
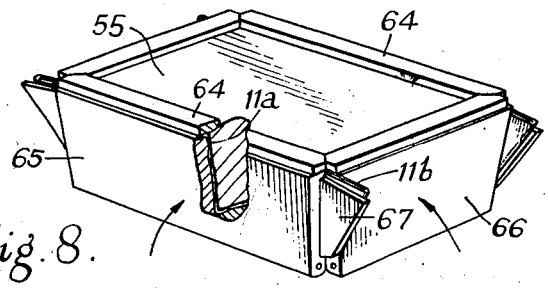

The downward movement of the die continuing, it carries the platen and the cut blank down with it to a position, about half way down its stroke, when the side and end bars 65 and 66 are raised by fixed abutments (see below) into the position illustrated in FIGURE 8 in which they turn up the overlapping side and end margins 11c of the blank 11a and press these margins against the die. As will be seen from FIGURE 8, this also forms outstanding double-over triangular corner flaps 11b in the blank.

The shaping assembly and the blank continue downwards until cam means (described below) operate to allow the end bars 66 to drop down and then, after a short further period of travel, the folding wings 67 are swung around to fold the flaps 11b down against the parent end walls 11c of the embryo pan. This virtually represents the end of the descent of the head of the shaping assembly, whereafter it is returned upwards by the reversing of the flow of oil in the cylinder 10, as described above.

During approximately the first third of this upstroke, the corner folding wings 67 are swung aside out of contact with the foil and the side folding bars 65 are allowed to drop down into their original position (see FIGURE 10) flush with the platen 58 itself. At the end of this phase of the upward travel, the rim folding mechanism is operated (again as described below) so that the rim folding bars 64 are turned down through 90° into the position illustrated in FIGURE 10, in which they turn over the upper rim 11d of the pan blank and consolidate this rim by pressure against the adjacent side or end wall of the blank. This not only stiffens the rim of the blank against subsequent crumpling, but also serves to trap and hold the flaps 11b firmly, so holding the blank erected against collapse. This completes the formation of the pan.

During the last third of the upward movement of the shaping assembly, the rim folding bars 64 are released, so that the bars 64 now swing back clear of the rim 11d, and the die 55 lifts away from the platen carrying the formed pan 11a–d with it by friction. As will be described below, the pan is, during this final phase, ejected from the die and from the machine by an automatic air blow.

FIGURES 11 to 14 give the details of the means for operating the various folding tools referred to above.

In the first place, raising of the side folding bars 65 during downward travel of the shaping head is performed by contact of these bars with appropriately-positioned abutment rollers 68 mounted by horizontal arms 69 in fixed pillars 113 on the platform 62. It will be recalled that the side bars 65 are to drop down again under gravity as the shaping head moves upwards. As a safety precaution fixed tappets 102 are mounted on the pillars 113 to contact and knock down any side bars still upstanding as the head rises.

On the other hand, the end bars 66 are adapted to be raised, at the appropriate time, by plungers 71 which are moved with the mounting plate 60 during the first part of the downward travel of the latter but are adapted, at the required stage in this travel, to move upwards relatively thereto and thereby abut and lift the bars 66. For this purpose the plungers 71 are slidable in blocks 72 carried by the plate 60, each being normally urged downwardly by a spring 73 so that the head 74 of the plunger is applied against the top of the block 72 and lies just below the end bar 66 concerned. A guide pin 75 moving in a groove 76 in the plunger prevents rotation of this plunger relatively to the block 72. Each plunger has a foot 77 which is urged downwardly by a spring 73 disposed around the plunger and bearing against the underside of the block 72.

The platform 62 carries a pivotable pawl 79 positioned below each of the plungers 71, and each of these pawls has a lateral cheek 80 which is disposed in the path of travel of this plunger so that, at the time the descending platen has reached the position at which the rollers 68 first contact the side bars 65, the plunger feet 77 meet their respective abutments 80, and during continued downward movement of the shaping head, the plungers 71 are raised relatively to the mounting plate 60 to lift the end bars 66, in performance of the folding operation described above.

Figure 9:
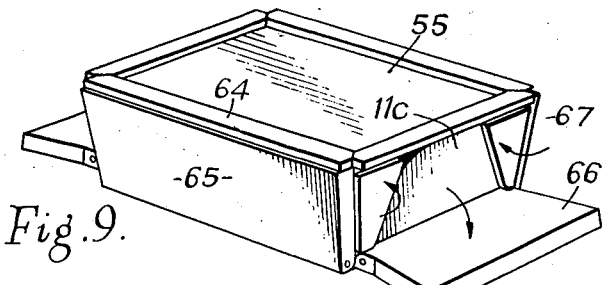
Figure 10:
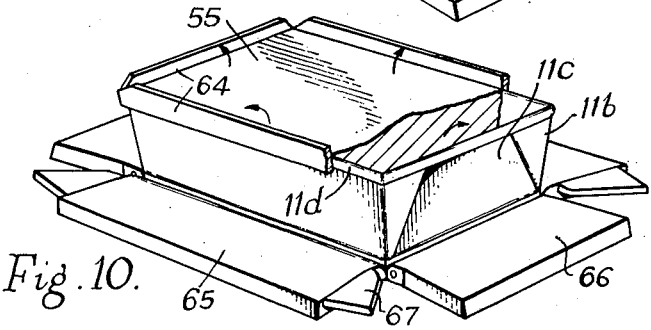
Figure 11:
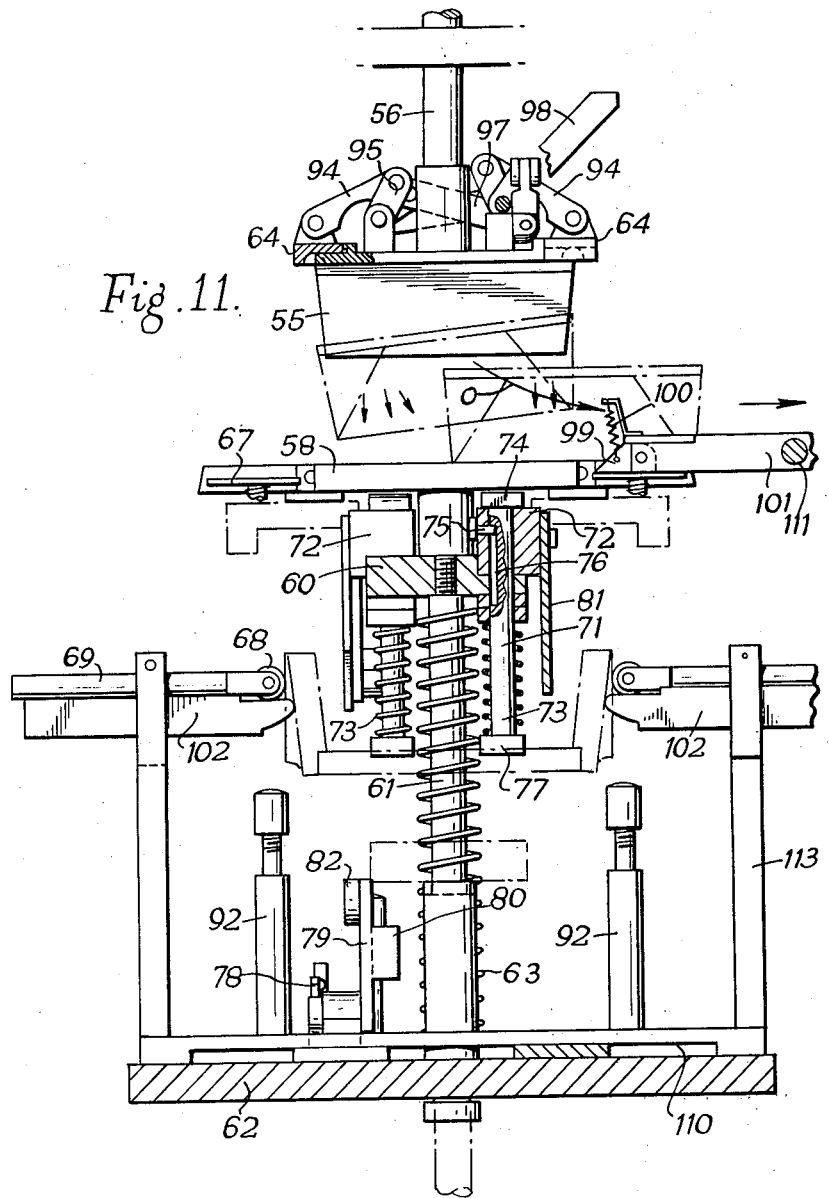
FIGURE 11 is an elevational view of the shaping assembly in the machine, partly in section on line XI—XI of FIGURE 13.
Figure 12:
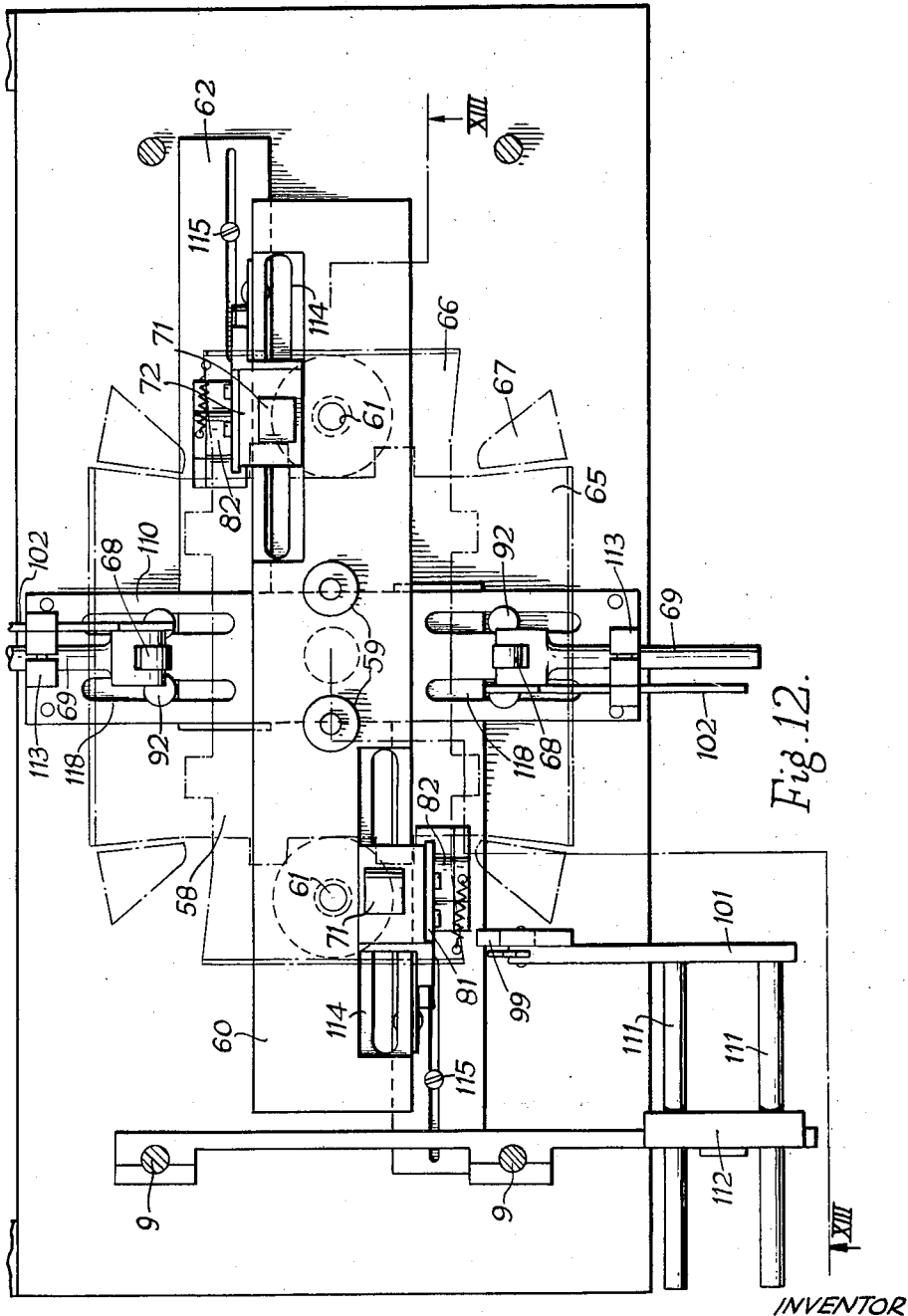
FIGURE 12 is a plan view of the shaping assembly.

Each mounting plate 60 has attached thereto a depending cam plate 81 corresponding to each of the pawls 79, and, when the assembly moves into the position indicated in FIGURE 9, this cam plate is arranged to push aside the roller 82 carried by the corresponding pawl 79, against the action of a return spring 78, whereby the abutment cheeks 80 are swung out of the way of the plungers 71 and the latter are retracted downwards through their blocks 72, under the action of their springs 73, to enable the side flaps 66 to drop.

Provision is made to ensure that the plungers 71 will be positively retracted. For this purpose each of the blocks 72 has an extension with a presser finger 83 pivoted thereon and cooperating with the foot 77 of the corresponding plunger 71. A fixed stop 84 of adjustable height is mounted on the platform 62 for abutment with the tail of each pawl 83 during its downward travel with the plate 60, thereby to pivot the pawl and knock the plunger 73 downwards.

To enable the operation of the corner folding wings 67 to be described, reference will first be made to FIGURE 16 of the accompanying drawings which illustrates the folding mechanism on the platen. Each wing 67 is spring-pressed on a stem 85 carried by a bellcrank lever 86 which is biassed by a tension spring 87 to normally hold the plate 67 in the retracted position seen in FIGURES 7, 8 and 10. The bellcrank lever 86 is articulated to a push rod 88 itself coupled through a universal joint 89 to a further bellcrank lever 90 pivoted on a lug 91 secured to the parent side bar 65.

The platform 62 has further stops 92 of adjustable height disposed in the path of the noses 93 of the bellcrank levers 90 so that, when the platform 62 descends sufficiently for such contact to take place, the stops 92 cause the bellcranks 90 to swing and apply the corner folding wings against the end walls of the die and thus fold down the flaps 11b as described above. During the return upward movement of the platform 62, the bellcranks 90 leave the stops 92, so that the tension springs 87 can restore the parts of the mechanism to their original position, i.e. swing back the folding wings 67.

The means for operating the third set of folding tools, viz. the rim folding bars 64, are best described with reference to FIGURES 14, 17 and 18 of the accompanying drawings. Each of these bars has a part-cylindrical stub 116 at its two ends and these stubs move in corresponding seats in a fixed block 117 at the corresponding corner of the die.

Each of the rim folding bars 64 of one opposite pair is articulated to one (94) of two toggle levers and the other (95) is connected to one of two parallel rotatable spindles 96 surmounting and running the length of the die 55, and coupled by a linkage 97 so that they operate in unison. Each of the other pair of bars 64 has to turn about an axis at right-angles to the length of the operating spindle 96, and this is accomplished by a lever transmission comprising a pin 118 rotatably attached to the bar concerned and carrying a relatively-rotatable fork 119 to which is hinged one end of a link 120; this link is articulated at its other end to a similar forked pin 121 rotatable in a lever 122 fixed to the spindle 96.

One of the spindles 96 carries an operating finger 98 which cooperates with a fixed catch 99 on the machine frame. This catch 99 is pivoted on a fixed arm 101 on the machine and is under the influence of a spring 100 such that, during the downward movement of the die, it is pushed aside by the finger 98 without affecting the mechanism 94—98 but, in the upward direction of movement of the latter, it swings the finger 98 so as to cause the turning down of the rim folding bars 64 in their operative movement as described above (see FIGURE 18).

From FIGURE 18 it will be seen that the die body 55 is bored with ducts 103 which are connected to the air pipe 34 supplied by operation of the first finger 31 and with a separate duct 104 connected to the other of these pipes.

At the end of the pan folding operation, and when the die is clear of the platen, air is first sent through the ducts 103 to detach the formed pan from the die, and a quickly-following blast of air is then sent through the other pipe 34 and the obliquely disposed duct 104 to blow the pan off in the direction of arrow O (FIGURE 11) to an appropriate collecting point.

It is to be understood that the various parts of the machine illustrated are adjustable, not only to allow for initial setting of the machine to a particular job, but also to allow for adaption of the machine to deal with pans of different sizes, in which event a different-size and differently-dimensioned die block and platen will be employed.

To allow for the variation to the latter conditions, the size of the cut blank requires to be varied, and for this purpose the punch section 5 of the cutting assembly B can be advanced, or retracted, in the direction of foil feed, relatively to the fixed assembly C. Thus table 48 supporting the punches is mounted on a carriage 105 which is slidable on a sub-frame 106 of the machine by means of a screw threaded rod 107. The adjustment of the widthways spacing of the punched-out corners is accomplished by a simple sliding of the punch anvils 47 and brackets 45 transversely of the table 48. The arms 43 can be shifted along their shaft 42 and relocked in the adjusted position.

The guillotine 6 must also be adjustable in the feed direction and must also be movable relatively to the punches 5, so as to cater for different widths of blank both vis-à-vis the punches and the shaping assembly; for this purpose the guillotine is secured to a sliding frame 108 settable by screws 109 (FIGURE 1) at different positions on the frame 9. Again, the length of each intermittent feeding step of the web material 11 is adjustable by appropriate setting of the dogs 16 and the contact bar 15 on the rod 17.

To cater for the operation of die and platen heads of different sizes, the stops 92 can be adjusted in slots 118 in a frame 110 on which they are mounted.

For the purpose of adjusting the catch 99, the arm 101 carrying the same is (see FIGURE 12) mounted by means of a pair of parallel rods 111 adjustably mounted in a slide 112 which itself is shiftable on a part of the frame 9 of the machine, whereby the position of the catch 99 can be altered in each of two directions at right angles to one another.

The rollers 68 are adjustable by simple reclamping of the arms 69, carrying the same, in their mounting uprights 113, as are also the tappets 102. The blocks 72, and with them the plungers 71 and the cam plates 81, are adapted to be shifted in longitudinal slots 114 in the mounting plate 60 and clamped in the adjusted position. The abutment pawls 79 are similarly adjustable along a groove 117 in the fixed plate 62 in the widthways direction and adapted to be set by screws 115.

Cam plates 81 are also adjustable heightwise on the mounting plate 60 and settable by means of screws 116, whilst the stops 84, 92 are capable of heightwise adjustment by screwing.

I claim:

1. In a machine for fabricating a pan from sheet material in a single reciprocating stroke, a shaping assembly comprising reciprocable die and platen members, the die member and platen member being relatively movable and defining engageable faces for the disposition and clamping of a pan blank therebetween, said pan blank having a marginal part extending around and projecting laterally from each of said faces and the platen member being disposed below said blank; a first set of tools pivotably mounted on said platen member engaging the marginal part and pivoting upwardly to fold said part toward the die member and form side walls against the die member and outwardly extending corner flaps, the first set of tools including at least two oppositely mounted pairs of folding tools; a second set of tools pivotably mounted on one of said mounted pairs of folding tools engaging the corner flaps and folding said flaps against the side walls; a third set of tools pivotably mounted on one of the said members engaging the side walls at their extremities and folding said extremities to form rims; and a series of abutments sequentially engaging the first, second and third sets of tools for operation thereof during the single reciprocating stroke.

2. The shaping assembly according to claim 1 wherein the third set of tools is mounted on the die member.

3. The shaping assembly according to claim 1 wherein the first and second sets of tools operate during the forward motion of said reciprocating stroke and the third set operates during the return motion.

4. In a machine for fabricating a pan from sheet material in a single reciprocating stroke, a shaping assembly comprising reciprocable die and platen members defining engageable faces, the die member and the platen member being relatively movable for the disposition and gripping of a pan blank between the faces, said pan blank having a marginal part extending around and projecting laterally from said faces; a first set of tools pivotably mounted on the platen member engaging the marginal part and folding said part toward the die member to form side walls against the die member and outwardly extending corner flaps; a second set of tools pivotably mounted on one of said members engaging the corner flaps and folding said flaps against the side walls; a third set of tools pivotably mounted on one of the members engaging the side walls at their extremities and folding said extremities to form rims; abutments sequentially operating all of the sets of tools by engagement therewith; and means for moving the platen member and die member together to grip the blank and thereafter reciprocating the members past the abutments to operate the sets of tools.

5. The shaping assembly according to claim 4 wherein the second set of tools is mounted on the platen member and the third set of tools is mounted on the die member.

6. The shaping assembly according to claim 5 in which the first set of tools comprises at least two groups each serving to form a pair of opposite side walls, and the second set of tools is mounted on at least one group of the said first set.

7. The shaping assembly according to claim 6 wherein the abutments comprise fixed abutments positioned for operation of a first group of said first set of tools, movable abutments positioned to operate the second group, and means movable with the platen member to shift the movable abutments and release the second group of tools for subsequent operation of the second set of tools.

8. The shaping assembly according to claim 7 in which the abutments further comprise additional movable abutments operating the third set of tools during the return stroke of the die and platen members, and means for moving the additional abutments to render them inoperative during the forward stroke, the additional abutments being positioned so as to operate during the return stroke subsequent to release of the first set of tools and the second set of tools.

9. In a machine for fabricating a pan from sheet material in a single reciprocating stroke, a shaping assembly comprising reciprocable die and platen members, the die member and platen member being relatively movable and defining engageable faces for the disposition and clamping of a pan blank therebetween, said pan blank having a marginal part extending around and projecting laterally from each of said faces; a first set of tools pivotably mounted on said platen member engaging the marginal part and folding said part toward the die member to form side walls against the die member and outwardly extending corner flaps, the first set of tools including at least two oppositely mounted pairs of folding tools; a second set of tools pivotably mounted on one of said mounted pairs of folding tools engaging the corner flaps and folding set flaps against the side walls; a third set of tools pivotably mounted on one of said members engaging the side walls at their extremities and folding said extremities to form rims; means reciprocating the die and platen members and operating the sets of tools; means intermittently feeding a web of pan material from a supply; an assembly cutting a pan blank from the web during each pause in the intermittent feed; and means operating the cutting assembly in timed relationship with the means reciprocating the die and platen members to simultaneously cut the blank with the gripping of the leading end of the web between the faces of the die and platen members.

10. A machine as claimed in claim 9, in which the cutting assembly comprises a guillotine for severing and detaching the blank from the web, and punches for cutting out portions of the lateral edges of the web to form shortened corner flaps, said punches and guillotine being operable simultaneously.

References Cited in the file of this patent

UNITED STATES PATENTS

| | | |
|---|---|---|
| 213,126 | Morgan | Mar. 11, 1879 |
| 219,798 | Bowers | Sept. 23, 1879 |
| 227,196 | Alexander | May 4, 1880 |
| 237,084 | Beaman | Feb. 1, 1881 |
| 260,604 | Palmer | July 4, 1882 |
| 566,522 | Lindemann | Aug. 25, 1896 |
| 1,288,037 | Kotzich | Dec. 17, 1918 |
| 1,558,345 | De Lin | Oct. 20, 1925 |
| 1,643,609 | Roepke | Sept. 27, 1927 |
| 1,789,981 | Katzinger | Jan. 27, 1931 |
| 1,965,648 | Jackson | July 10, 1934 |
| 2,269,474 | Nordquist | Jan. 13, 1942 |
| 2,371,138 | Harrison et al. | Mar. 13, 1945 |